US011525927B2

(12) United States Patent
Hasegawa

(10) Patent No.: US 11,525,927 B2
(45) Date of Patent: Dec. 13, 2022

(54) ELECTRONIC DEVICES AND POSITIONAL INFORMATION OBTAINING METHOD

(71) Applicant: Casio Computer Co., Ltd., Tokyo (JP)

(72) Inventor: Kosuke Hasegawa, Koganei (JP)

(73) Assignee: Casio Computer Co., Ltd., Tokyo (JP)

( * ) Notice: Subject to any disclaimer, the term of this patent is extended or adjusted under 35 U.S.C. 154(b) by 526 days.

(21) Appl. No.: 16/515,378

(22) Filed: Jul. 18, 2019

(65) Prior Publication Data
US 2020/0025941 A1    Jan. 23, 2020

(30) Foreign Application Priority Data

Jul. 20, 2018 (JP) .............................. JP2018-136828

(51) Int. Cl.
*G01S 19/45* (2010.01)
*G01S 19/51* (2010.01)
*G01S 5/02* (2010.01)
*G01S 19/34* (2010.01)

(52) U.S. Cl.
CPC ............ *G01S 19/45* (2013.01); *G01S 5/0252* (2013.01); *G01S 19/34* (2013.01); *G01S 19/51* (2013.01)

(58) Field of Classification Search
CPC ........ G01S 5/0252; G01S 19/34; G01S 19/45; G01S 19/51
See application file for complete search history.

(56) References Cited

U.S. PATENT DOCUMENTS

2002/0069019 A1 * 6/2002 Lin ...................... G08G 5/0008
701/9

FOREIGN PATENT DOCUMENTS

| JP | H11-166827 A | 6/1999 |
| JP | 2005-091184 A | 4/2005 |
| JP | 2007-334465 A | 12/2007 |
| JP | 2010-008154 A | 1/2010 |
| JP | 2016-143280 A | 8/2016 |
| JP | 2018-009961 A | 1/2018 |

OTHER PUBLICATIONS

Notice of Reasons for Refusal, dated Oct. 27, 2020, for corresponding Japanese Patent Application No. 2018-136828, 6 pages. (With English Translation).

* cited by examiner

*Primary Examiner* — Dao L Phan
(74) *Attorney, Agent, or Firm* — Seed IP Law Group LLP

(57) ABSTRACT

An electronic device includes a receiver, a processor, and a communication unit. Via the communication unit from an external device, the processor receives altitude information on each of altitudes obtained at intervals of a first period, at intervals of a second period that is longer than the first period, and individually receives altitude information on an altitude obtained not at intervals of the first period. In response to receiving the altitude obtained not at intervals of the first period, the processor performs positioning at the receiving timing. Based on obtainment timings of the altitudes received at intervals of the second period and an obtainment timing of the altitude received individually, the processor correlates the altitudes received at intervals of the second period and the altitude received individually with positioning results of the positioning such that the obtainment timings correspond to positioning timings of the positioning results.

9 Claims, 9 Drawing Sheets

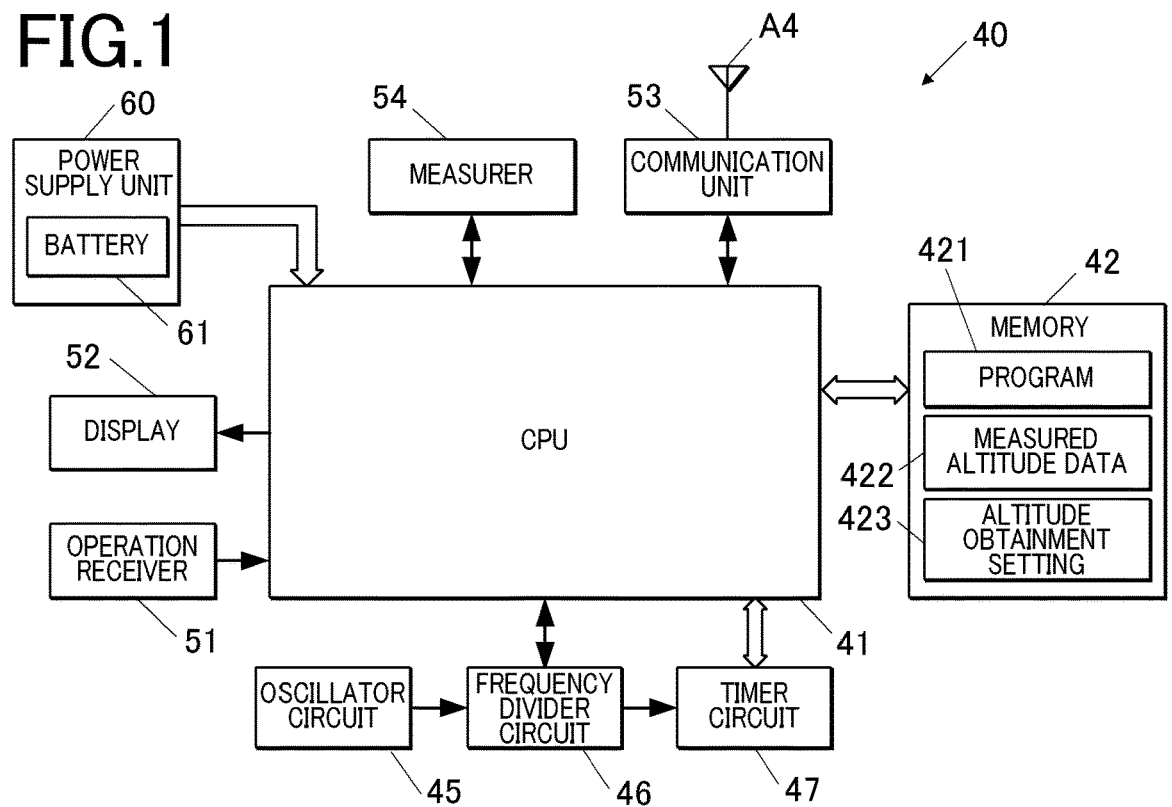
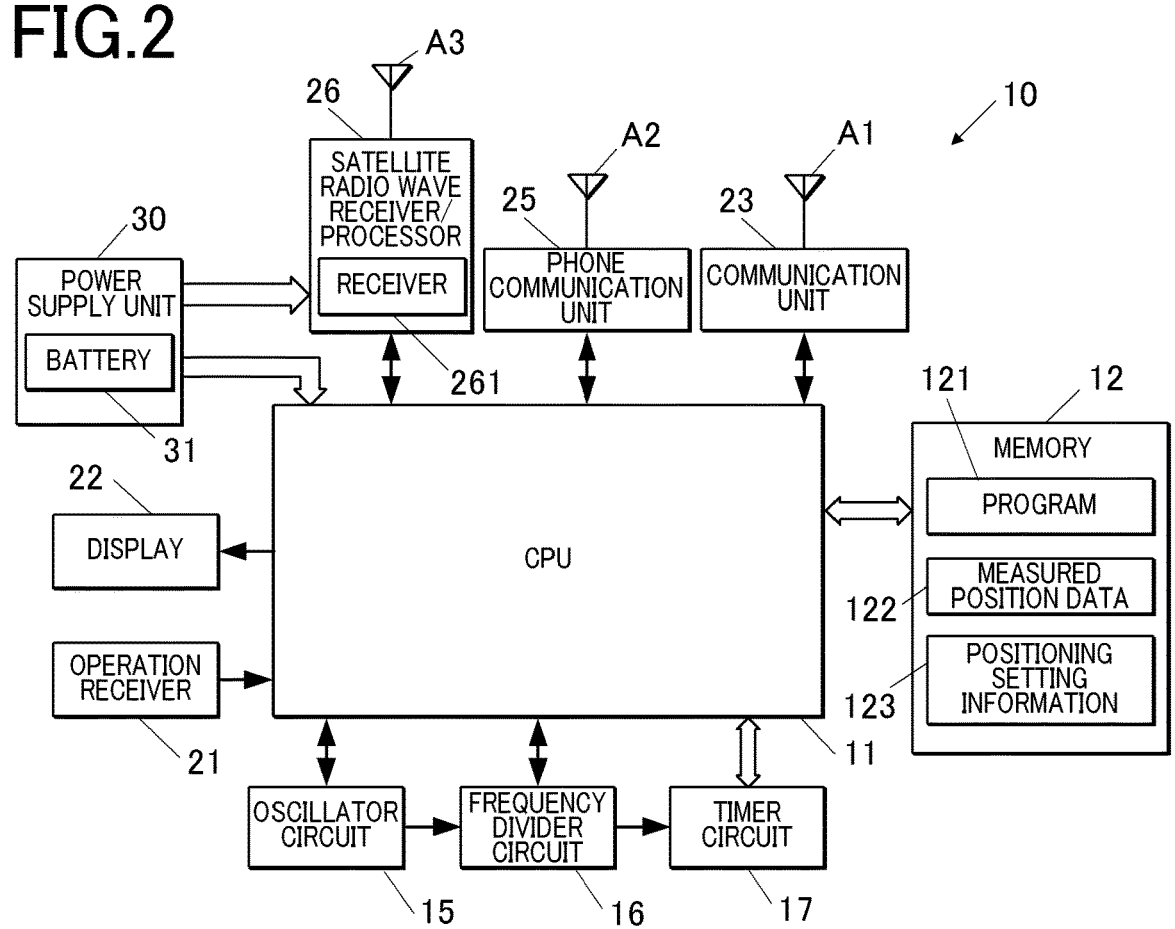

FIG.3A

| TIME | LATITUDE | LONGITUDE | ALTITUDE |
|---|---|---|---|
| 2018-06-30T15:13:00Z | 35.972980 | 138.370610 | 2816.7 |
| 2018-06-30T15:15:00Z | 35.972798 | 138.370405 | 2831.9 |
| 2018-06-30T15:17:01Z | 35.972504 | 138.370329 | 2847.1 |
| 2018-06-30T15:19:00Z | 35.972072 | 138.370316 | 2873.3 |
| 2018-06-30T15:21:01Z | 35.971651 | 138.370316 | 2872.1 |
| 2018-06-30T15:23:01Z | 35.971480 | 138.370234 | 2888.3 |
| 2018-06-30T15:24:35Z | 35.971186 | 138.370300 | 2900.5 |
| 2018-... | 35.971056 | 138.370211 | 2899.9 |
| | | 138.370034 | 2905.7 |

FIG.3B

| | |
|---|---|
| 2824.9 | |
| 2835.3 | |
| 2857.3 | |
| 2867.7 | |
| 2882.4 | |
| 2888.2 | |
| 2888.5 | |
| 2899.2 | |
| | |
| | |
| | |
| | |
| | |
| | |
| | |
| | 00:02:00 |

FIG.3C

| | |
|---|---|
| 2018-06-30T15:24:19Z | 2889.0 |
| | |
| | |
| | |
| | |

FIG.4

| TIME | LATITUDE | LONGITUDE | ALTITUDE |
|---|---|---|---|
| 2018-06-30T15:13:00Z | 35.972980 | 138.370610 | 2824.9 |
| 2018-06-30T15:15:00Z | 35.972798 | 138.370405 | 2835.3 |
| 2018-06-30T15:17:01Z | 35.972504 | 138.370329 | 2857.3 |
| 2018-06-30T15:19:00Z | 35.972072 | 138.370316 | 2867.7 |
| 2018-06-30T15:21:01Z | 35.971651 | 138.370316 | 2882.4 |
| 2018-06-30T15:23:01Z | 35.971480 | 138.370234 | 2888.2 |
| 2018-06-30T15:24:35Z | 35.971186 | 138.370300 | 2889.0 |
| 2018-… | 35.971056 | 138.370211 | 2888.5 |
| … | … | 138.370034 | 2899.2 |

ELECTRONIC DEVICES AND POSITIONAL INFORMATION OBTAINING METHOD

CROSS-REFERENCE TO RELATED APPLICATIONS

This application is based upon and claims the benefit of priority from the prior Japanese Patent Application No. 2018-136828, filed on Jul. 20, 2018, the entire contents of which are incorporated herein by reference.

BACKGROUND

The present disclosure relates to electronic devices and a positional information obtaining method.

There is known an electronic device that receives radio waves from positioning satellites and performs positioning. By receiving radio waves from four or more positioning satellites, the electronic device can obtain position(s) in a horizontal plane, altitude(s), and the current date and time. Position accuracy to be obtained varies according to arrangement of positioning satellites with respect to the electronic device. Because positioning satellites, from which the electronic device can receive radio waves, are located above the horizon, altitude accuracy is lower than horizontal-position accuracy, and may vary irregularly according to change in arrangement of positioning satellites.

Meanwhile, there is known a technology for suppressing altitude variation by obtaining values of altitude into which values of air pressure measured by an air pressure sensor of an external device are converted, and combining the obtained values of altitude with horizontal positions in positioning results. (See, for example, JP 2018-9961 A.)

In order to obtain proper three-dimensional positions by using an electronic device that performs positioning at timings and an external device that performs air pressure measurement at other timings, it is necessary to make the measurement timings of the electronic device and the external device coincide. However, always-on connection increases power consumption, which is likely to lead to reduction of their measurement capable periods.

SUMMARY

Electronic devices and a positional information obtaining method are disclosed herein.

According to an embodiment, there is provided an electronic device including:
a receiver that receives radio waves from positioning satellites;
a processor that performs positioning at intervals of a first period based on the radio waves from the positioning satellites received by the receiver; and
a communication unit that receives, from an external device, altitude information on each altitude obtained by the external device, wherein
the processor:
from the external device, receives the altitude information on altitudes obtained at intervals of the first period, at intervals of a second period that is longer than the first period, and individually receives the altitude information on an altitude obtained not at intervals of the first period;
in response to receiving the altitude information on the altitude obtained not at intervals of the first period, performs the positioning at a timing of receiving the altitude information on the altitude; and
based on (i) obtainment timings of the altitudes in the external device received at intervals of the second period and (ii) an obtainment timing of the altitude in the external device received individually, correlates the altitudes of the altitude information received at intervals of the second period and the altitude of the altitude information received individually with positioning results of the positioning such that the obtainment timings correspond to positioning timings of the positioning results.

BRIEF DESCRIPTION OF THE DRAWINGS

The accompanying drawings, which are incorporated in and constitute apart of the specification, illustrate embodiments, and together with the general description given above and the detailed description of the embodiments given below, serve to explain the principles of the present invention, wherein:

FIG. 1 is a block diagram showing a functional configuration of an electronic timepiece;

FIG. 2 is a block diagram showing a functional configuration of a smartphone;

FIG. 3A shows an example of measured position data obtained by the smartphone;

FIG. 3B shows an example of measured altitude data obtained by the electronic timepiece;

FIG. 3C shows an example of the measured altitude data obtained by the electronic timepiece;

FIG. 4 shows an example of the measured position data into which the measured altitude data is integrated by the smartphone;

DETAILED DESCRIPTION

Figure 5:
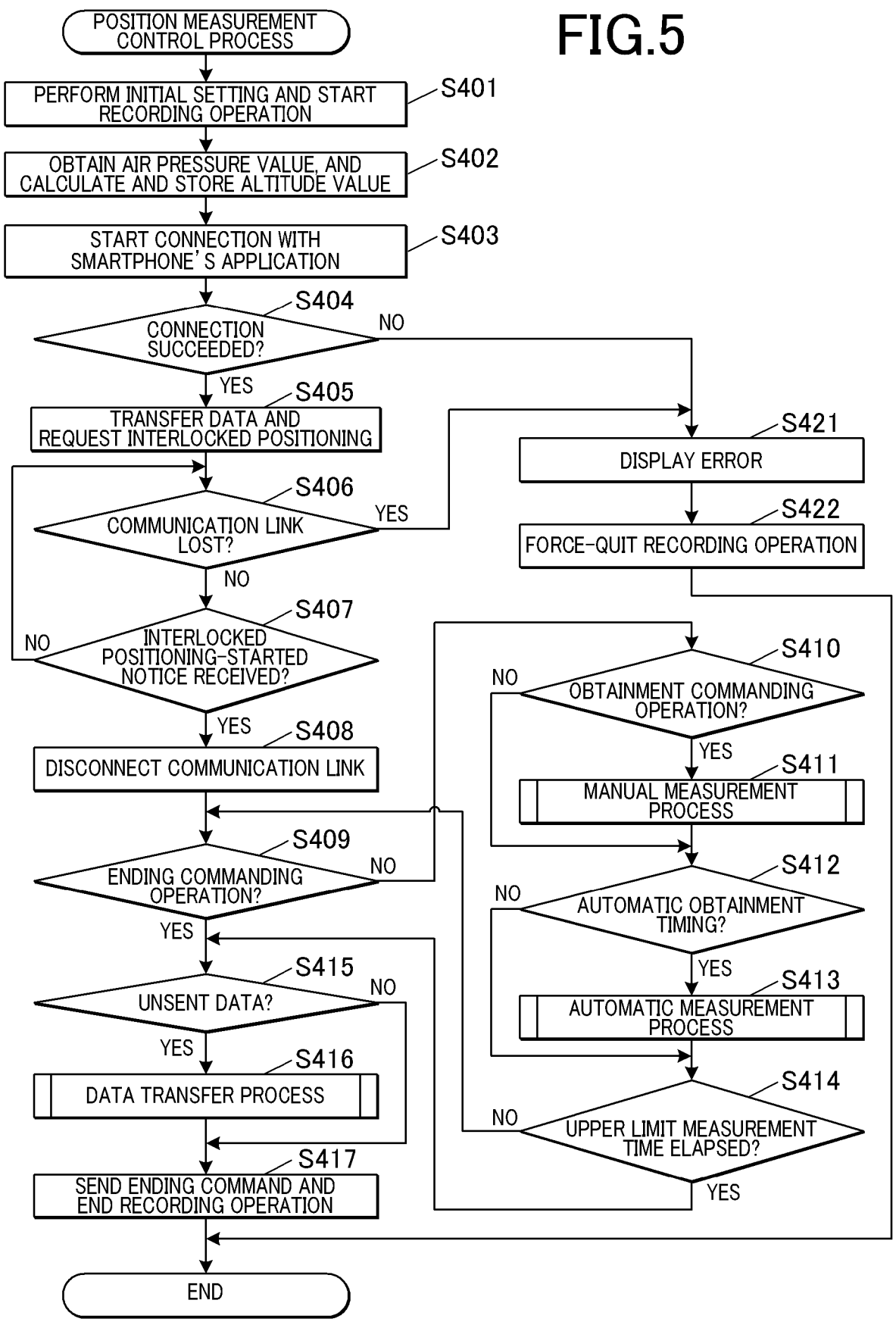
FIG. 5 is a flowchart showing a control procedure of a position measurement control process.

Hereinafter, one or more embodiments will be described with reference to the drawings.

FIG. 1 is a block diagram showing a functional configuration of an electronic timepiece 40, which is an external device to a smartphone 10 that performs positioning operation, as one electronic device of an embodiment(s). FIG. 2 is a block diagram showing a functional configuration of the smartphone 10, which is an external device to the electronic timepiece 40 that performs altitude obtainment, as the other electronic device of the embodiment.

As shown in FIG. 1, the electronic timepiece 40 includes a CPU (Central Processing Unit) 41, a memory 42 (storage), an oscillator circuit 45, a frequency divider circuit 46, a timer circuit 47, an operation receiver 51, a display 52, a communication unit 53 and its antenna A4, a measurer 54, and a power supply unit 60.

The CPU 41 is a processor that performs various types of arithmetic processing, and integrally controls operation of each component of the electronic timepiece 40. The CPU 41 reads and executes programs 421 stored in the memory 42, thereby performing various types of control operation. The CPU 41 converts values of air pressure (air pressure values) measured by an air pressure sensor of the measurer 54 into values of altitude (altitude values), thereby obtaining the values of altitude.

The memory 42 provides the CPU 41 with a memory space for work, and stores various data. The memory 42 includes, for example, a RAM and a nonvolatile memory. The RAM is used by the CPU 41 to perform the arithmetic processing, and stores temporary data. The nonvolatile memory stores initial settings, the programs 421, and so forth. The memory 42 stores measured altitude data 422 and an altitude obtainment setting 423. The altitude obtainment setting 423 includes: at least one of a table, a mathematical formula, and a correction formula for converting values of air pressure measured by the air pressure sensor of the measurer 54 into values of altitude; and data on settings about an altitude obtainment interval (first period) and an altitude sending interval (second period) in an automatic mode. An air-pressure-to-altitude profile may vary according to weather conditions or the like. Hence, in order to obtain accurate altitude from air pressure, it is at least necessary to obtain and save a known corresponding relationship between altitude and air pressure as a correction value(s) before starting altitude obtainment operation, for example. As a method for obtaining the correction value, any conventional method can be used, which includes: obtaining the correction value by a user input operation(s); and obtaining, from outside, a result obtained by using horizontal position(s) and map data as the correction value. The correction value thus obtained is included in the altitude obtainment setting 423.

The measured altitude data 422 stores each altitude information that includes at least an obtained altitude (altitude value). As described below, in the case where altitudes are automatically obtained at predetermined intervals, only altitude data are stored in the measured altitude data 422 as the altitude information, whereas in the case where an altitude is obtained at a timing in response to an input operation, altitude data and current date-and-time data are stored in the measured altitude data 422 as the altitude information. The memory size of the measured altitude data 422 is predetermined. In this embodiment, the measured altitude data 422 can store a predetermined number of automatically obtained altitude data and a predetermined number of manually obtained altitude data. The altitude information sent to an external device, i.e. the smartphone 10, via the communication unit 53 is deleted in order. That is, the altitude information in the measured altitude data 422 is stored therein until the altitude information is sent to the smartphone 10.

The oscillator circuit 45 generates and outputs a clock signal(s) of a predetermined oscillation frequency of, for example, 32.768 kHz to the frequency divider circuit 46. The frequency divider circuit 46 divides the clock signal input from the oscillator circuit 45, thereby converting the clock signal into a signal of a frequency that is necessary for each component of the electronic timepiece 40 to operate, and outputs the signal. The destination of the signal generated by the frequency divider circuit 46 includes the timer circuit 47.

The timer circuit 47 counts the signals of the frequency input from the frequency divider circuit 46 to calculate and keep the current date and time. The format of the current date and time kept by the timer circuit 47 is not limited to the year, month, date, hour, minute and second format, and may be any format as far as it is suitable for processes performed by the CPU 41 or the like.

The operation receiver 51 receives input operations from outside, for example, from a user(s), and outputs input signals corresponding to the input operations to the CPU 41. The operation receiver 51 includes, for example, push-button switches and a crown. The operation receiver 51 may include a touchscreen provided in such a way as to overlay the display screen of the display 52.

The display 52 performs display operation under the control of the CPU 41. The display 52 has, as a digital display screen, a liquid crystal display or an organic EL display, for example. Instead of or in addition to the digital display screen, the display 52 may have an analog display where hands are driven to rotate by stepping motors or the like.

The communication unit 53 communicates with external electronic devices via the antenna A4 in accordance with near-field communication, such as Bluetooth® communication. The communication unit 53 sends the altitude information stored in the measured altitude data 422.

The measurer 54 measures a predetermined physical quantity, i.e. air pressure in this embodiment, with the air pressure sensor, and outputs the measurement result (measured value) to the CPU 41. The air pressure sensor has, for example, a piezoelectric film, and converts its deformation quantity into a voltage value or the like, and outputs the value. The measurer 54 may be configured to not only measure air pressure but also convert the measured value into an altitude value as described below, and output data of the altitude value to the CPU 41.

The power supply unit 60 includes a battery 61, and from the battery 61, supplies power with a predetermined voltage (may supply the power indirectly via the CPU 41 or the like) to each component of the electronic timepiece 40 to operate. The battery 61 includes, for example, a solar panel and a storage battery. Alternatively, as the battery 61, a detachable dry cell or button cell may be used. Still alternatively, the battery 61 may have a secondary cell, such as a lithium-ion battery, which can be charged by being connected to a power source through a certain cable.

As shown in FIG. 2, the smartphone 10 includes a CPU 11, a memory 12, an oscillator circuit 15, a frequency divider circuit 16, a timer circuit 17, an operation receiver 21, a display 22, a communication unit 23 and its antenna A1, a phone communication unit 25 and its antenna A2, a satellite radio wave receiver/processor 26 and its antenna A3, and a power supply unit 30.

The CPU 11 is a processor that performs various types of arithmetic processing, and integrally controls operation of each component of the smartphone 10. The CPU 11 reads and executes programs 121 stored in the memory 12, thereby performing various types of control operation. The control operation to be performed includes positioning control operation that causes the satellite radio wave receiver/processor 26 to operate. The CPU 11 may be a multi-core processor. As the CPU 11, not one but two or more CPUs may be provided. For example, a CPU dedicated to positioning may be provided in the satellite radio wave receiver/processor 26.

The memory 12 provides the CPU 11 with a memory space for work, and stores various data. The memory 12 includes, for example, a RAM and a nonvolatile memory. The RAM is used by the CPU 11 to perform the arithmetic processing, and stores temporary data. The nonvolatile memory stores initial settings, the programs 121, and so forth. The memory 12 stores measured position data 122 and positioning setting information 123. The measured position data 122 stores positioning results obtained by operation of the satellite radio wave receiver/processor 26. Each positioning result is correlated with altitude data obtained from the electronic timepiece 40 as described below. The positioning setting information 123 may include ephemeris and almanac that are orbit information on each positioning satellite used for positioning. The positioning setting information 123 includes data on settings about a positioning result obtainment interval (first period) from the satellite radio wave receiver/processor 26 and an altitude reception interval (second period) from the electronic timepiece 40 in an automatic mode. Apart of the memory 12, for example, storage areas for the measured position data 122 and the positioning setting information 123, may be provided in the satellite radio wave receiver/processor 26.

The programs 121 include a position measurement application. The position measurement application causes (operation of) the electronic timepiece 40 and (operation of) the satellite radio wave receiver/processor 26 to interlock with one another to obtain three-dimensional positions. The position measurement application may be started in response to a predetermined input operation received by the operation receiver 21 or in response to a request from the electronic timepiece 40.

The oscillator circuit 15 generates and outputs a clock signal(s) of a predetermined oscillation frequency to the CPU 11 and the frequency divider circuit 16. The frequency divider circuit 16 divides the clock signal input from the oscillator circuit 15, thereby converting the clock signal into a signal of a frequency that is necessary for each component of the smartphone 10 to operate, and outputs the signal. The destination of the signal generated by the frequency divider circuit 16 includes the timer circuit 17.

The timer circuit 17 counts the signals of the frequency input from the frequency divider circuit 16 to calculate and keep the current date and time. The format of the current date and time kept by the timer circuit 17 is not limited to the year, month, date, hour, minute and second format, and may be any format as far as it is suitable for processes performed by the CPU 11 or the like.

The operation receiver 21 receives input operations from outside, for example, from a user(s), and outputs input signals corresponding to the input operations to the CPU 11. The operation receiver 21 includes, for example, a touchscreen provided in such a way as to overlay the display screen of the display 22. The operation receiver 21 may include push-button switches.

The display 22 performs display operation under the control of the CPU 11. The display 22 has, as a digital display screen, a liquid crystal display or an organic EL display, for example. The display 52 may have an LED light or the like for indicating a predetermined status(es).

The communication unit 23 communicates with external electronic devices (electronic timepiece 40 included) via the antenna A1 in accordance with near-field communication, such as Bluetooth® communication. The near-field communication protocol(s) includes at least the near-field communication protocol(s) of the communication unit 53 of the electronic timepiece 40. The communication unit 23 allows the smartphone 10 to receive altitude information from the electronic timepiece 40.

The phone communication unit 25 makes contact with mobile phone stations and so forth via the antenna A2 to send and receive voice data in phone communication, packet data in relation to Internet connection, and so forth.

The satellite radio wave receiver/processor 26 has a receiver 261, and receives and detects radio waves from positioning satellites via the antenna A3, and processes the radio waves, for example, tunes and/or decodes the radio waves. The satellite radio wave receiver/processor 26 can obtain information, such as the current date and time, on the basis of contents of the received radio waves, and also can calculate (measure) the current position by positioning calculation.

The power supply unit 30 includes a battery 31, and from the battery 31, supplies power with a predetermined voltage (may supply the power indirectly via the CPU 41 or the like) to each component of the smartphone 10 to operate. The battery 31 includes, for example, a secondary cell, such as a lithium-ion battery, which can be charged by being connected to a power source through a certain cable.

Next, operation for obtaining the current position using two electronic devices (smartphone 10 and electronic timepiece 40) of this embodiment will be described.

The smartphone 10 performs positioning operation to identify three-dimensional positions by operation of the satellite radio wave receiver/processor 26. However, the height-direction position (altitude) is less accurate than the horizontal position (latitude and longitude), and often varies within a short period. The smartphone 10 hence requests altitude obtainment results obtained by operation of the measurer 54 from the electronic timepiece 40, receives altitude data from the electronic timepiece 40, and combines the received altitude data with horizontal position data obtained by positioning.

Positioning and altitude obtainment are performed in two operational modes. One of the modes is the automatic mode to perform positioning and altitude obtainment at intervals of a predetermined period (first period), and the other thereof is a manual mode to perform altitude obtainment in the electronic timepiece 40 not at first-period intervals but at a timing at which the operation receiver 51 receives an obtainment request (predetermined command), and perform positioning in the smartphone 10 being triggered by the obtained altitude (obtainment result) transferred to the smartphone 10 in approximately real time (not at second-period intervals), i.e. to perform positioning in the smartphone 10 at a timing at which the smartphone 10 receives the obtained altitude. Positioning operation is controlled by the CPU 11, and altitude obtainment is controlled by the CPU 41. The settings about the periods (first period and second period) are included/set in both the positioning setting information 123 and the altitude obtainment setting 423, for example. If, for example, the first period is changeable, the setting (first period) is appropriately managed such that the setting for positioning (included in the positioning setting information 123) and the setting for altitude obtainment (included in the altitude obtainment setting 423) are not different from one another.

FIG. 3A shows an example of the measured position data 122 obtained by the smartphone 10.

In the measured position data 122, each set of a latitude, a longitude, and an altitude are correlated with a positioning date and time. Positioning operation has been performed at first-period intervals, at two-minute intervals in this embodiment, and the positioning results are stored. In the measured position data 122, in addition to the positioning results at the positioning/measurement timings of every two minutes, one positioning result (at "2018-06-30T 15:24:35Z" (UTC) in FIG. 3A) is included. In the measured position data 122, in addition to values of latitude, longitude, and altitude, values indicating accuracy, such as values of the number of positioning satellites used for positioning and/or DOP (Dilution of Precision), may be stored. The smartphone 10 normally has sufficient room in its storage capacity for the measured position data 122. Depending on the situation, however, positioning results may be sent to and stored in a storage on the cloud or the like.

FIG. 3B and FIG. 3C show examples of the measured altitude data 422 obtained by the electronic timepiece 40. The measured altitude data 422 includes automatically obtained data, which have been automatically obtained at regular intervals (automatic obtainment), and manually obtained data, which has(ve) been obtained in response to an input operation(s) (manual obtainment). In the case of the automatic obtainment, as shown in FIG. 3B, in the measured altitude data 422, only the obtained values, i.e. the altitude values calculated from the measured air pressure values, are simply stored in order as array data without their obtainment dates and times. If altitude obtainment (air pressure measurement) fails, a value indicating the failure is stored/saved. That is, a value at the timing is not simply left out.

In this embodiment, in the measured altitude data 422, 30 data, which are more than (twice, to be specific) the number of altitude data obtained at first-period intervals in one second period, can be stored in order. That is, there are 30 storage regions. Among these, 15 storage regions are ordinary storage regions, and at every 15 measurements (at second-period intervals, the second period being longer than the first period), the altitude information stored in the measured altitude data 422 is transferred to the smartphone 10. The other 15 storage regions are log-data storage regions where if 15 data stored in the ordinary storage regions have failed to be transferred to the smartphone 10, the data are temporarily stored. In this embodiment, if data stored in the log-data storage regions and data stored in the ordinary storage regions have failed to be transferred (i.e. if the number of obtained altitude data exceeds the maximum number of data storable in the measured altitude data 422), the data stored in the log-data storage regions are overwritten with the data stored in the ordinary storage regions, so that the old log data, i.e. the altitude data obtained previously, are deleted. Consequently, the ordinary storage regions are ensured for data to be obtained. The log data do not need to be delated at once, and may be delated in order in accordance with a predetermined condition. For example, whenever a new altitude is obtained, one log data is deleted in chronological order from the oldest. As another example, every other data is deleted in advance.

As far as the measurement (obtainment) dates and times themselves are not stored, for example, numerals indicating the order of measurement and/or numerals indicating errors of the measurement results may be stored in the measured altitude data 422 as needed. If the shared measurement interval (first period) is changeable, information on the first period set by an input operation on the operation receiver 51 or the like may be stored in the measured altitude data 422. In FIG. 3B, as the last element of the array, "00:02:00" indicating an interval of two minutes is set. In the case where the shared measurement interval is set in both the altitude obtainment setting 423 and the positioning setting information 123 as described above, the measurement interval may not be stored in the measured altitude data 422, and accordingly it is unnecessary to allot, to the measured altitude data 422, a memory capacity for saving the measurement interval.

As shown in FIG. 3C, the altitude information on the manually obtained altitude data includes the measurement date and time. In this embodiment, five manually obtained data can be stored at the maximum.

The altitude information on each altitude obtained in the electronic timepiece 40 is transferred to the smartphone 10. The transfer timing is, as described above, at regular intervals in the automatic mode, and in approximately real time in the manual mode. More specifically, in the automatic mode, obtained altitude data are transferred at second-period intervals, and in the manual mode, obtained altitude data are transferred individually immediately after they are obtained, but in such a way as not to coincide with first-period intervals. The smartphone 10 identifies the altitude information received that includes altitude data obtained in the automatic mode, as the altitude information that includes altitude data obtained at first-period intervals starting from the most recent positioning timing in the automatic mode going back to the past at first-period intervals. The smartphone 10 correlates each received altitude information (altitude data) with each data in the measured position data 122 such that the obtainment time, which the smartphone 10 has identified, of each altitude information corresponds to the obtainment time (positioning timing (or time)) of each data in the measured position data 122, and replaces each altitude value obtained by positioning with its corresponding altitude information received, or stores both.

FIG. 4 shows an example of the measured position data 122 into which the measured altitude data 422 is integrated by the smartphone 10.

In this embodiment, the altitude data shown in FIG. 3B and FIG. 3C replace the altitude data in the positioning results shown in FIG. 3A. However, it is impossible from the measured position data 122 only to determine whether or not the positioning results have been subjected to the replacement. Hence, in the measured position data 122, a flag indicating whether or not the replacement has been done may be stored by being correlated with each date-and-time data.

FIG. 5 is a flowchart showing a control procedure by the CPU 41 in a position measurement control process performed by the electronic timepiece 40 of this embodiment. The position measurement control process is started when the operation receiver 51 receives a predetermined input operation for starting position measurement from a user, for example.

When the position measurement control process is started, the CPU 41 performs initial setting and starts recording operation of measured (obtained) altitude data (Step S401). The initial setting includes: setting the measurement interval; and setting correction data for conversion/calculation data from air pressure values into altitude values suitable for the current air pressure. Setting correction data may include obtaining an altitude value of the current position that the operation receiver 51 accepts after the position measurement control process is started. The CPU 41 obtains an air pressure value from the measurer 54, converts the air pressure value into an altitude value referring to the altitude obtainment setting 423, and stores the altitude value in the measured altitude data 422 (Step S402). The CPU 41 may cause the display 52 to display the obtained altitude value. The CPU 41, via the communication unit 53, causes the smartphone 10 to start the position measurement application included in the programs 121 of the smartphone 10, and makes a connection request (Step S403). If the smartphone 10 is the master device, the smartphone 10 attempts connecting (e.g. polling) at regular intervals to operate with the least delay in following an event occurred in the electronic timepiece 40.

The CPU 41 determines whether or not the connection with the position measurement application has succeeded within a predetermined limit period (Step S404). If the CPU 41 determines that the connection has not succeeded (failed) (Step S404; NO), the CPU 41 causes the display 52 to display an error (Step S421), and force-quits the recording operation (Step S422). The CPU 41 then ends the position measurement control process.

If the CPU 41 determines that the connection with the positon measurement application has succeeded (Step S404; YES), the CPU 41, via the communication unit 53, transfers data of the altitude information that includes the calculated and stored altitude value to the smartphone 10, and requests the position measurement application to cause the smartphone 10 to perform positioning operation by interlocking with altitude obtainment of the electronic timepiece 40 (Step S405).

The CPU 41 determines whether or not a communication link relevant to the connection with the position measurement application has been lost (Step S406). If the CPU 41 determines that the communication link has been lost (Step S406; YES), the CPU 41 proceeds to Step S421. If the CPU 41 determines that the communication link has not been lost (Step S406; NO), the CPU 41 determines whether or not it has received a notice that the interlocked positioning operation has started (Step S407). If the CPU 41 determines that it has not received the notice (Step S407; NO), the CPU 41 returns to Step S406. If the CPU 41 determines that it has received the notice (Step S407; YES), the CPU 41 disconnects the communication connection (link) with the smartphone 10 (position measurement application) (Step S408).

The CPU 41 determines whether or not the operation receiver 51 has received a position measurement ending commanding operation (e.g. a press on a predetermined push-button switch) (Step S409). If the CPU 41 determines that the operation receiver 51 has received the ending commanding operation (Step S409; YES), the CPU 41 proceeds to Step S415.

If the CPU 41 determines that the operation receiver 51 has received no position measurement ending commanding operation (Step S409; NO), the CPU 41 determines whether or not the operation receiver 51 has received a manual obtainment commanding operation (e.g. a press on a predetermined push-button switch or a long press thereon for a predetermined period or more, i.e. holding down the switch) (Step S410). If the CPU 41 determines that the operation receiver 51 has received the manual obtainment commanding operation (Step S410; YES), the CPU 41 calls and performs a manual measurement process (Step S411). The CPU 41 then proceeds to Step S412. If the CPU 41 determines that the operation receiver 51 has received no manual obtainment commanding operation (Step S410; NO), the CPU 41 proceeds to Step S412.

In Step S412, the CPU 41 determines on the basis of the last measurement (obtainment) timing and the set measurement interval whether or not it is an automatic obtainment timing (Step S412). If the CPU 41 determines that it is an automatic obtainment timing (Step S412; YES), the CPU 41 calls and performs an automatic measurement process (Step S413). The CPU 41 then proceeds to Step S414. If the CPU 41 determines that it is not an automatic obtainment timing (Step S412; NO), the CPU 41 proceeds to Step S414. It should be noted that the CPU 41 may obtain a measured air pressure value, calculate an altitude value therefrom, and cause the display 52 to display the altitude value, even not at an automatic obtainment timing. In such a case, the obtained altitude value should be deleted after being displayed, without being stored/saved in the measured altitude data 422.

In Step S414, the CPU 41 determines whether or not a predetermined upper limit measurement period has elapsed since the start of the recording operation (Step S414). The upper limit measurement period is a value properly set in the electronic timepiece 40, e.g. 12 hours. Instead of the upper limit measurement period, which is in units of time, for example, a timing at which a measurement result (or a positioning result) indicates arrival at a predetermined location, or a timing until which the amount of movement (which may be the amount of movement in the horizontal direction only) of the electronic timepiece 40 maintains a reference amount or less for a predetermined period after the aforementioned timing, may be used. If the CPU 41 determines that the upper limit measurement period has not elapsed yet (Step S414; NO), the CPU 41 returns to Step S409. If the CPU 41 determines that the upper limit measurement period has elapsed (Step S414; YES), the CPU 41 proceeds to Step S415.

In Step S415 after Step S409 or Step S414, the CPU 41 determines whether or not, in the measured altitude data 422, unsent data to the smartphone 10 is present (Step S415). If the CPU 41 determines that unsent data is present (Step S415; YES), the CPU 41 calls and performs a data transfer process (Step S416). The CPU 41 then proceeds to Step S417. If the CPU 41 determines that no unsent data is present (Step S415; NO), the CPU 41 proceeds to Step S417.

In Step S417 after Step S415 or Step S416, the CPU 41 outputs a positioning ending command to the smartphone 10, and ends the recording operation (Step S417). In the case where the data transfer process is performed, the CPU 41 may output the positioning ending command at the beginning or the end of the communication connection with the smartphone 10 (position measurement application) in the data transfer process, for example. The CPU 41 then ends the position measurement control process.

Figure 6:
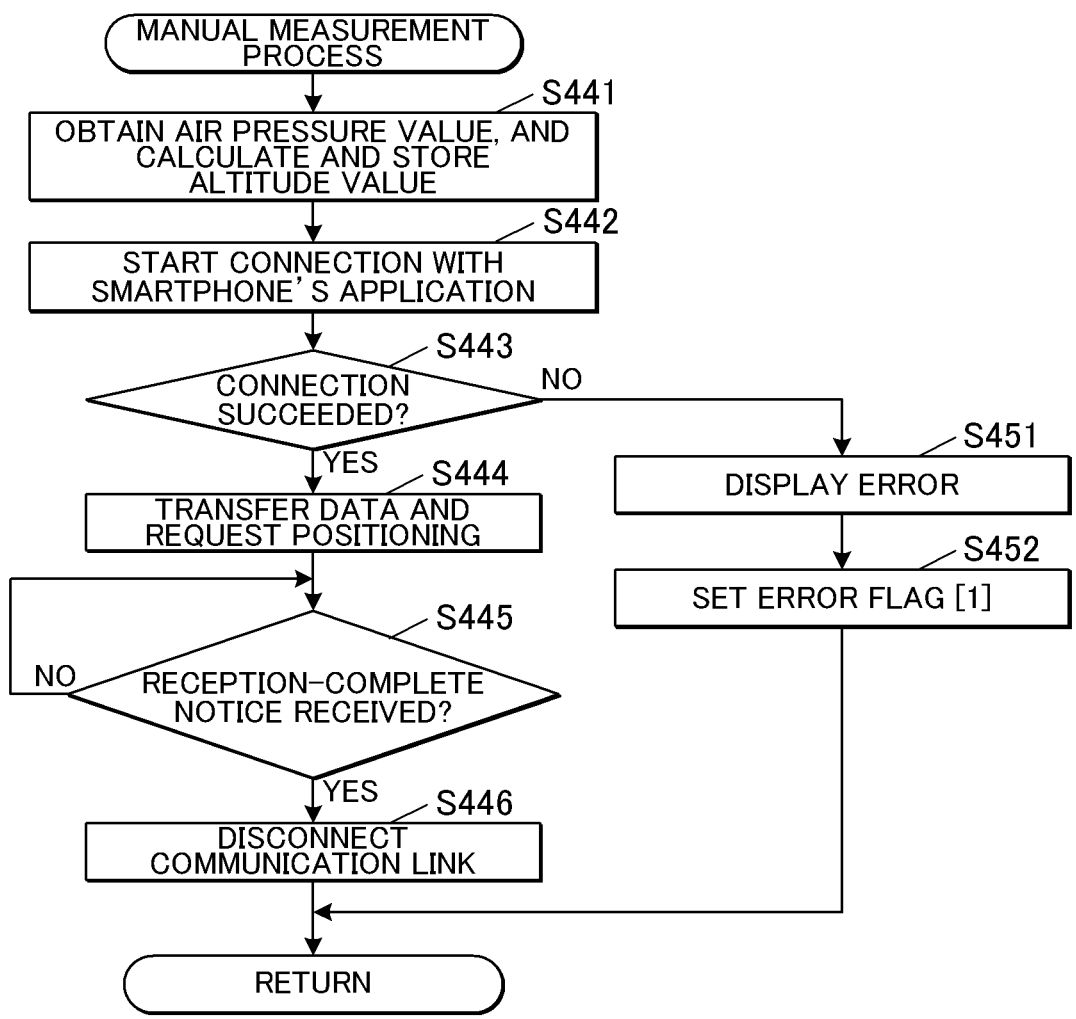
FIG. 6 is a flowchart showing a control procedure of a manual measurement process.

FIG. 6 is a flowchart showing a control procedure in the manual measurement process called in the position measurement control process.

When the manual measurement process is called, the CPU 41 obtains an air pressure value from the measurer 54, converts the air pressure value into an altitude value referring to the altitude obtainment setting 423, and stores the altitude value in the measured altitude data 422 together with its measurement (obtainment) date and time (Step S441). The CPU 41 may cause the display 52 to display the obtained altitude value. The CPU 41 attempts to start connection with the position measurement application of the smartphone 10 (Step S442).

The CPU 41 determines whether or not the connection with the position measurement application (smartphone 10) has succeeded (Step S443). If the CPU 41 determines that the connection has succeeded (Step S443; YES), the CPU 41 transfers the result of manual obtainment of altitude to the smartphone 10, and requests the position measurement application to perform positioning operation (Step S444). The CPU 41 determines whether or not it has received a data reception-complete notice from the smartphone 10 (Step S445). While the CPU 41 does not determine that it has received the notice (Step S445; NO), the CPU 41 repeats Step S445. If the CPU 41 determines that it has received the notice (Step S445; YES), the CPU 41 disconnects the communication link with the position measurement application (smartphone 10) (Step S446). The CPU 41 then ends the manual measurement process and returns to the position measurement control process.

It is not always necessary to store manually obtained altitudes (altitude values) as logs. For example, if the CPU 41 does not detect a predetermined input operation for storing an altitude value as a log within a predetermined period after obtaining and displaying the altitude value, the CPU 41 may delete the obtained altitude value and its measurement date and time.

If the CPU 41 determines that the connection with the position measurement application (smartphone 10) has failed (Step S443; NO), the CPU 41 causes the display 52 to display an error in obtainment of measured position data (Step S451). The CPU 41 sets (e.g. "1" in one bit data) an error flag [1], which is about manually obtained data (Step S452). The CPU 41 then ends the manual measurement process and returns to the position measurement control process.

Figure 7:
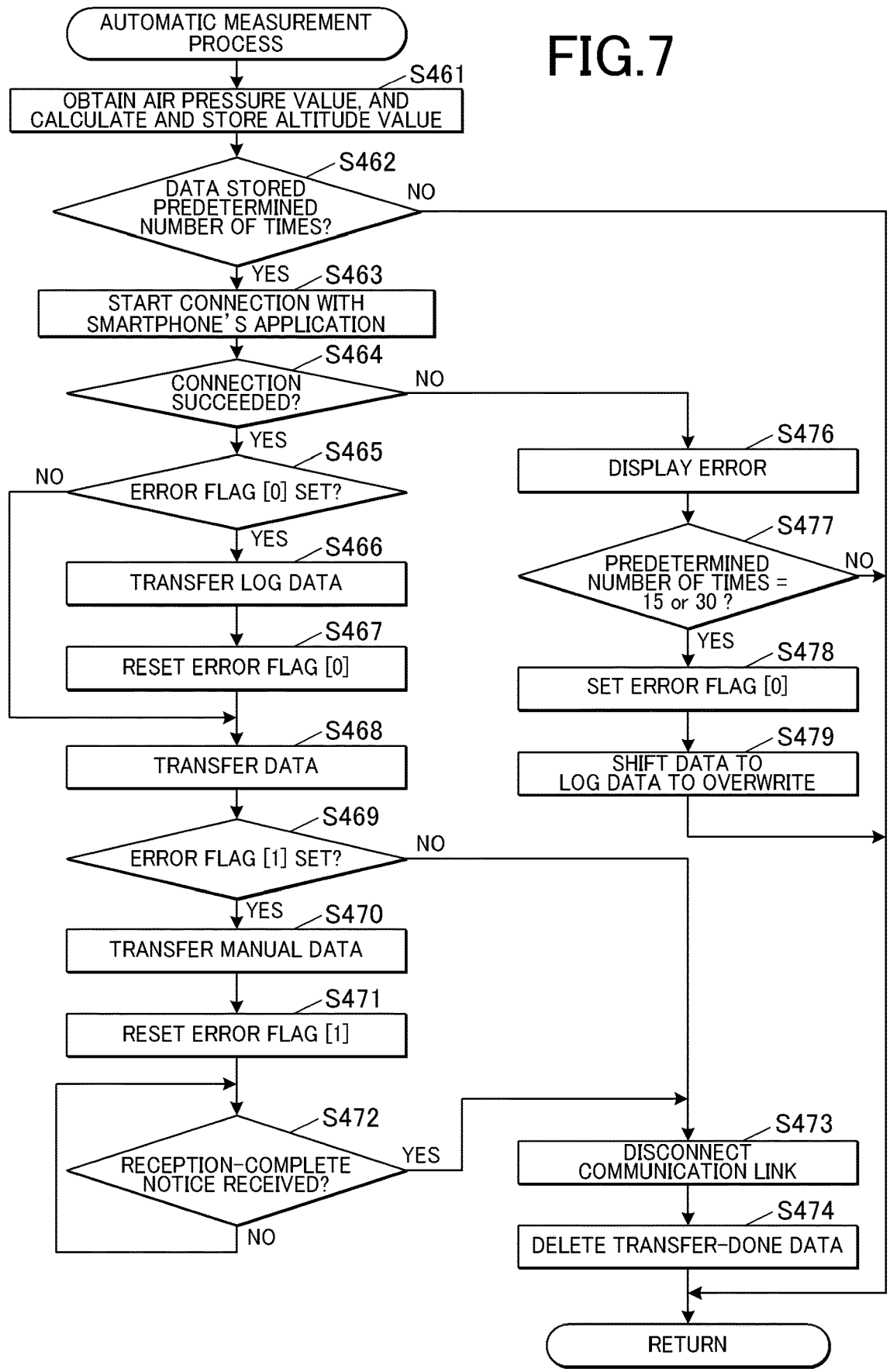
FIG. 7 is a flowchart showing a control procedure of an automatic measurement process.

FIG. 7 is a flowchart showing a control procedure in the automatic measurement process called in the position measurement control process.

When the automatic measurement process is called, the CPU 41 obtains an air pressure value from the measurer 54, converts the air pressure value into an altitude value referring to the altitude obtainment setting 423, and stores the altitude value in the measured altitude data 422 (Step S461). The CPU 41 may cause the display 52 to display the obtained altitude value. The CPU 41 determines whether or not it has stored data a predetermined number of times in the measured altitude data 422 (Step S462). In the electronic timepiece 40 of this embodiment, this predetermined number of times includes "15" and "30", and may also include "22", "26", and/or the like.

If the CPU 41 determines that it has not stored data the predetermined number of times (Step S462; NO), the CPU 41 ends the automatic measurement process and returns to the position measurement control process.

If the CPU 41 determines that it has stored data the predetermined number of times (Step S462; YES), the CPU 41 attempts to start connection with the position measurement application of the smartphone 10 (Step S463). The connection with the position measurement application does not need to be started immediately after the automatic obtainment of an altitude value, and may be started after a predetermined delay period, but needs to be started such that the automatic measurement process definitely finishes before the next automatic obtainment timing arrives. For example, if an altitude value is automatically obtained at 0 second of every even minute, the connection with the position measurement application is started at 0 second of every odd minute.

The CPU 41 determines whether or not the connection has succeeded (Step S464). If the CPU 41 determines that the connection has succeeded (Step S464; YES), the CPU 41 determines whether or not an error flag [0], which is about transfer of automatically measured data, is in a set state (e.g. "1" in one bit data) (Step S465). If the CPU 41 determines that the error flag [0] is in the set state (Step S465; YES), the CPU 41 transfers log data (data unsent last time) stored in the measured altitude data 422 to the smartphone 10 (Step S466). The CPU 41 resets the error flag [0] (e.g. "0" in one bit data) (Step S467), and proceeds to Step S468. In Step S465, if the CPU 41 determines that the error flag [0] is not in the set state (i.e. is in a reset state) (Step S465; NO), the CPU 41 proceeds to Step S468.

In Step S468, the CPU 41 transfers ordinary recorded data (data unsent this time) stored in the measured altitude data 422 to the smartphone 10 (Step S468). The CPU 41 determines whether or not the error flag [1], which is about manually obtained data, is in the set state (Step S469). If the CPU 41 determines that the error flag [1] is not in the set state (i.e. is in the reset state; e.g. the error flag [1] being "0") (Step S469; NO), the CPU 41 proceeds to Step S473.

If the CPU 41 determines that the error flag [1] is in the set state (Step S469; YES), the CPU 41 transfers, via the communication unit 53, manually obtained data stored in the measured altitude data 422 to the smartphone 10 (Step S470). The CPU 41 resets the error flag [1] (Step S471). The CPU 41 determines whether or not it has received a transfer data reception-complete notice from the smartphone 10 (Step S472). While the CPU 41 does not determine that it has received the notice (Step S472; NO), the CPU 41 repeats Step S472. If the CPU 41 determines that it has received the notice (Step S472; YES), the CPU 41 proceeds to Step S473.

In Step S473, the CPU 41 disconnects the communication link with the smartphone 10 (Step S473), and deletes the transfer-done contents of the measured altitude data 422 (Step S474). The CPU 41 then ends the automatic measurement process and returns to the position measurement control process.

In Step S464, if the CPU 41 determines that the connection with the smartphone 10 (position measurement application) has failed (Step S464; NO), the CPU 41 causes the display 52 to display a connection error (Step S476). The CPU 41 determines whether or not the predetermined number of times this time is "15" or "30" (Step S477). If the CPU 41 determines that the predetermined number of times this time is "15" or "30" (Step S477; YES), the CPU 41 sets the error flag [0], which is about transfer of automatically measured data (Step S478), and shifts the ordinary recorded data to log data in the measured altitude data 422 (Step S479). In this shifting operation, it is unnecessary to physical move the storage regions. In such a case, the setting of the ordinary data may be changed to "log data". In the case where the predetermined number of times this time is "30", the previously stored 15 data, i.e. log data, are deleted. These 15 log data may not be deleted immediately. In such a case, every time a new altitude value is obtained from now on, one log data may be overwritten therewith and thereby deleted. The CPU 41 then ends the automatic measurement process and returns to the position measurement control process.

In Step S477, if the CPU 41 determines that the predetermined number of times this time is neither "15" nor "30" (e.g. is "22", "26", or the like) (Step S477; NO), the CPU 41 ends the automatic measurement process and returns to the position measurement control process. If the predetermined number of times includes only "15" and "30", Step S477 is unneeded, and hence the CPU 41 proceeds to Step S478 after Step S476.

Figure 8:
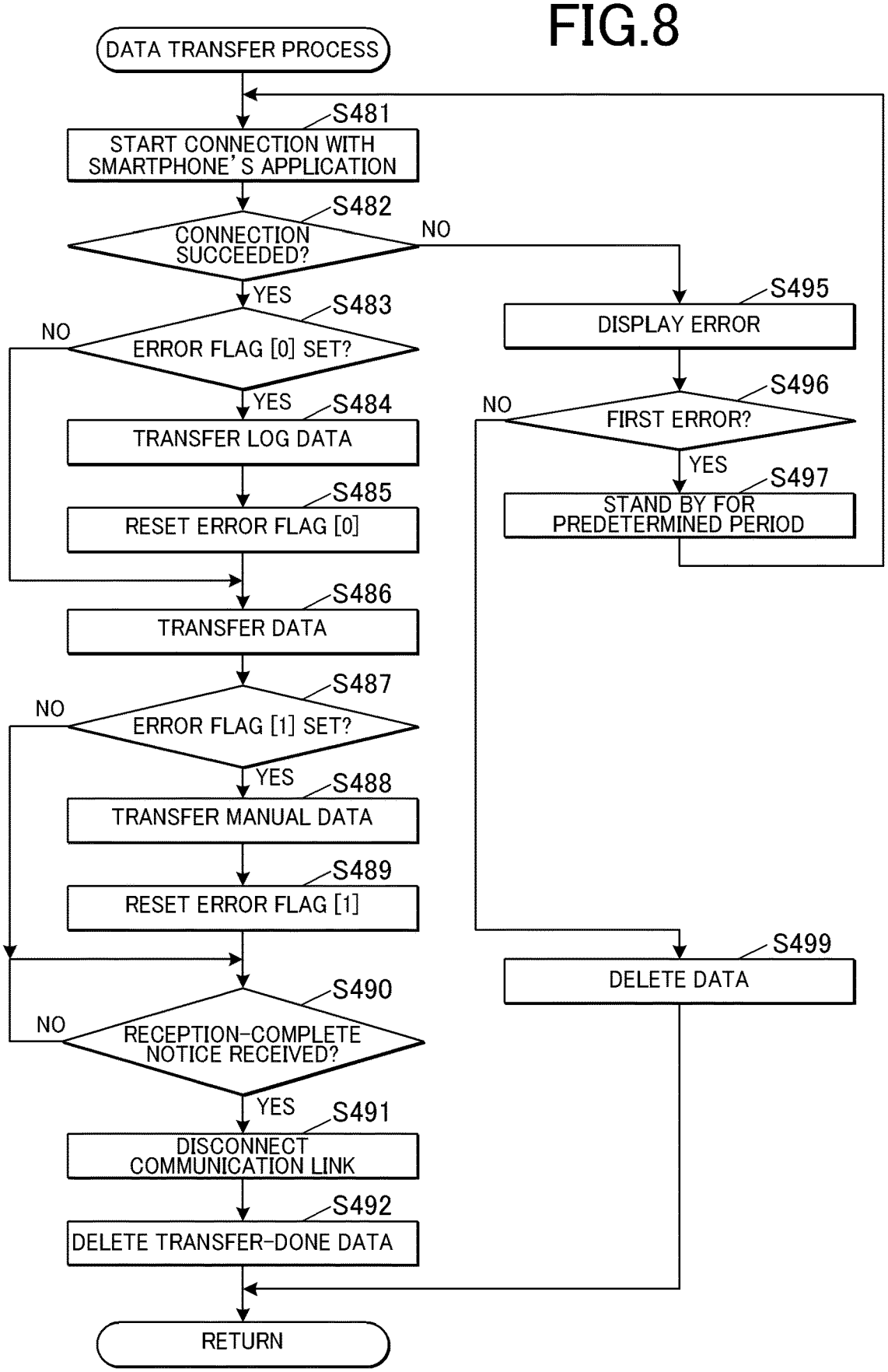
FIG. 8 is a flowchart showing a control procedure of a data transfer process.

FIG. 8 is a flowchart showing a control procedure in the data transfer process called in the position measurement control process.

When the data transfer process is called, the CPU 41 attempts to start connection with the position measurement application (smartphone 10) (Step S481). The CPU 41 determines whether or not the connection with the position measurement application (smartphone 10) has succeeded (Step S482).

If the CPU 41 determines that the connection with the position measurement application (smartphone 10) has succeeded (Step S482; YES), the CPU 41 determines whether or not the error flag [0], which is about transfer of automatically measured data, is in the set state (Step S483). If the CPU 41 determines that the error flag [0] is in the set state (Step S483; YES), the CPU 41 transfers log data of automatically measured data to the smartphone 10 (Step S484). The CPU 41 resets the error flag [0] (Step S485), and proceeds to Step S468. If the CPU 41 determines that the error flag [0] is not in the set state (i.e. is in the reset state) (Step S483; NO), the CPU 41 proceeds to Step S486.

In Step S486, the CPU 41 transfers ordinary data of automatically measured data to the smartphone 10 (Step S486). The CPU 41 determines whether or not the error flag [1], which is about manually obtained data, is in the set state (Step S487). If the CPU 41 determines that the error flag [1] is in the set state (Step S487; YES), the CPU 41 transfers stored manually obtained data to the smartphone 10 (Step S488). The CPU 41 resets the error flag [1] (Step S489), and proceeds to Step S490. If the CPU 41 determines that the error flag [1] is not in the set state (i.e. is in the reset state) (Step S487; NO), the CPU 41 proceeds to Step S490.

In Step S490, the CPU 41 determines whether or not it has received a transfer data reception-complete notice from the smartphone 10 (Step S490). While the CPU 41 does not determine that it has received the notice (Step S490; NO), the CPU 41 repeats Step S490.

If the CPU 41 determines that it has received the notice (Step S490; YES), the CPU 41 disconnects the communication link with the position measurement application (smartphone 10) (Step S491), and deletes the transfer-done data (Step S492). The CPU 41 then ends the data transfer process and returns to the position measurement control process.

In Step S482, if the CPU 41 determines that the connection with the position measurement application (smartphone 10) has failed (Step S482; NO), the CPU 41 causes the display 52 to display a connection error (Step S495). The CPU 41 determines whether or not this is the first connection error in the data transfer process (Step S496). If the CPU 41 determines that this is the first connection error (Step S496; YES), the CPU 41 stands by for a predetermined period (Step S497), and then returns to Step S481.

If the CPU 41 determines that this is not the first connection error (Step S496; NO), the CPU 41 deletes all the stored data (Step S499). The CPU 41 then ends the data transfer process and returns to the position measurement control process. It is not always necessary to delete the data. In such a case, when the next position measurement control process is started, the measured altitude data 422 is formatted. Before the next position measurement control process is started, the data may be transferred to the smartphone 10 in response to a user input operation, for example.

Figure 9:
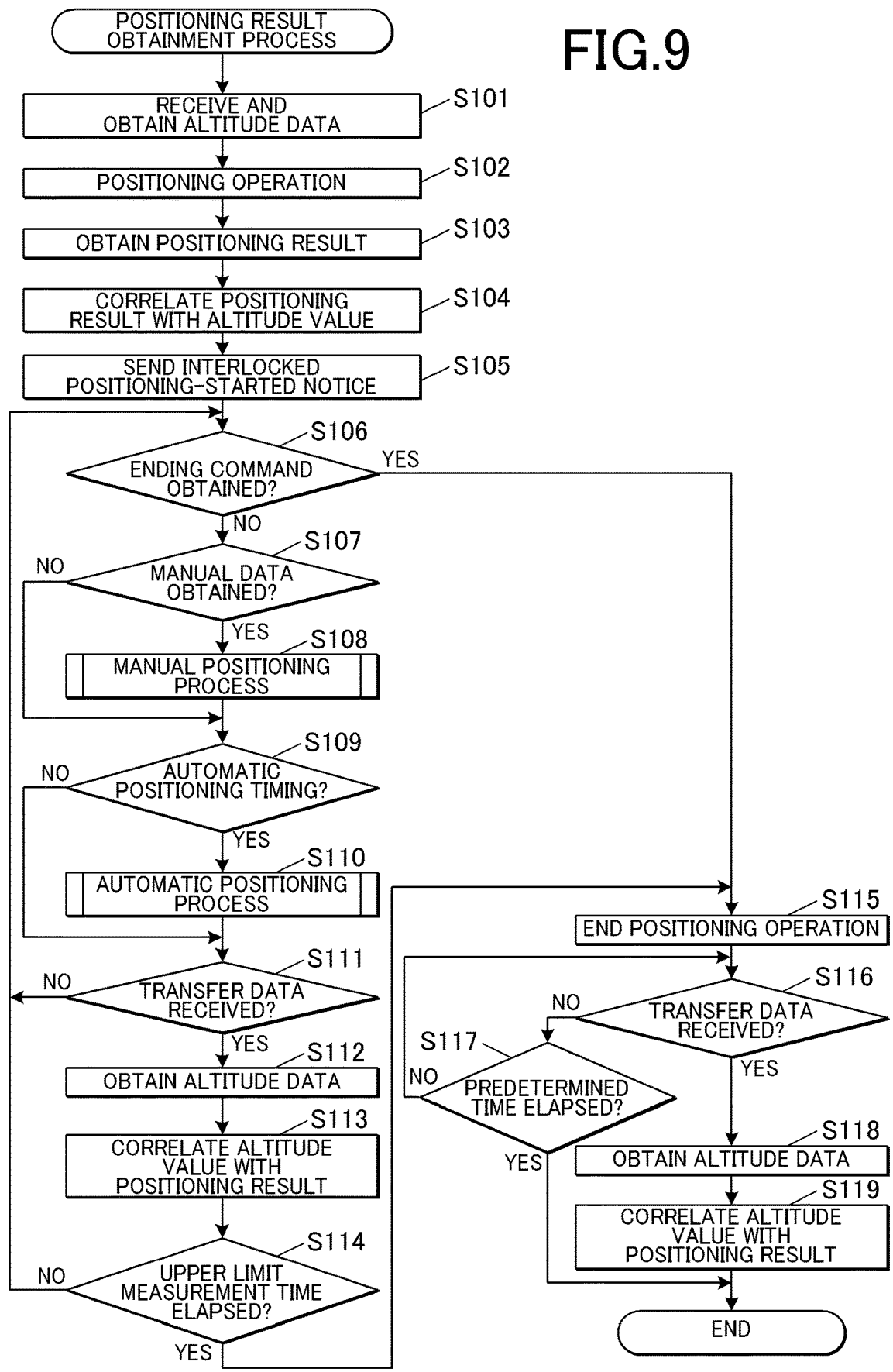
FIG. 9 is a flowchart showing a control procedure of a positioning result obtainment process.

FIG. 9 is a flowchart showing a control procedure by the CPU 11 in a positioning result obtainment process performed by the smartphone 10. The positioning result obtainment process is a positional information obtaining method performed by the smartphone 10 of this embodiment, and is performed on the basis of operation of the position measurement application and started in response to a start request from the electronic timepiece 40.

When the positioning result obtainment process is started, the CPU 11 receives and obtains data of the altitude information that includes altitude data from the smartphone 10 (Step S101). The receiving timing of this altitude information may be taken as the start timing of altitude obtainment (measurement) in the electronic timepiece 40. In order to make altitude obtainment timings in sync with positioning timings, information on the obtainment timing of this altitude data in the electronic timepiece 40 may also be obtained to be taken as the start timing of altitude obtainment in the electronic timepiece 40. The CPU 11 causes the satellite radio wave receiver/processor 26 to perform positioning operation (Step S102). The CPU 11 obtains the positioning result from the satellite radio wave receiver/processor 26 (Step S103).

The CPU 11 correlates the obtained positioning result with the altitude data (Step S104). The CPU 11 sends an interlocked positioning-started notice to the electronic timepiece 40 via the communication unit 23 (Step S105). Before Step S105, the CPU 11 obtains settings, such as the automatic positioning timings (first period), from the positioning setting information 123. If the positioning interval (first period) is specified by the electronic timepiece 40, the CPU 11 uses the specified positioning interval.

The CPU 11 determines whether or not it has received and obtained a positioning ending command from the electronic timepiece 40 (Step S106). If the CPU 11 determines that it has received the ending command (Step S106; YES), the CPU 11 proceeds to Step S115.

If the CPU 11 determines that it has received no positioning ending command (Step S106; NO), the CPU 11 determines whether or not it has received and obtained manually obtained altitude data from the electronic timepiece 40 (Step S107). If the CPU 11 determines that it has received manually obtained altitude data (Step S107; YES), the CPU 11 calls and performs a manual positioning process (Step S108). The CPU 11 then proceeds to Step S109. If the CPU 11 determines that it has received no manually obtained altitude data (Step S107; NO), the CPU 11 proceeds to Step S109.

In Step S109, the CPU 11 determines on the basis of the set positioning interval (first period) whether or not it is an automatic positioning timing (Step S109). If the CPU 11 determines that it is an automatic positioning timing (Step S109; YES), the CPU 11 calls and performs an automatic positioning process (Step S110). The CPU 11 then proceeds to Step S111. If the CPU 11 determines that it is not an automatic positioning timing (Step S109; NO), the CPU 11 proceeds to Step S111.

In Step S111, the CUP 11 determines whether or not it has received transfer data obtained by the automatic measurement process from the electronic timepiece 40 (Step S111). If the CPU 11 determines that it has received no transfer data (Step S111; NO), the CPU 11 returns to Step S106.

If the CPU 11 determines that it has received transfer data (Step S111; YES), the CPU 11 obtains altitude data in the received transfer data (Step S112). The CPU 11 calculates the obtainment (measurement) timings of the respective obtained altitude data, and, with respect to each altitude data, correlates the altitude data with, among the positioning results obtained so far, the positioning result the obtainment (positioning) timing of which is equal to or the closest to the obtainment timing of the altitude data (Step S113).

The CPU 11 determines whether or not an upper limit measurement period has elapsed since the start of the interlocked positioning operation (Step S114). The upper limit measurement period is the same as the upper limit measurement period used as a reference for the determination made in Step S414 in the electronic timepiece 40. If the CPU 11 determines that the upper limit measurement period has not elapsed yet (Step S114; NO), the CPU 11 returns to Step S106. If the CPU 11 determines that the upper limit measurement period has elapsed (Step S114; YES), the CPU 11 proceeds to Step S115.

In Step S115 after Step S106 or Step S114, the CPU 11 causes the satellite radio wave receiver/processor 26 to end the positioning operation (Step S115). In the case where the satellite radio wave receiver/processor 26 has been performing intermittent positioning at first-period intervals, the CPU 11 can cause the satellite radio wave receiver/processor 26 to delete temporarily stored data or the like, and can stop power supply to the satellite radio wave receiver/processor 26.

The CPU 11 determines whether or not it has received transfer data from the electronic timepiece 40 (Step S116). If the CPU 11 determines that it has received no transfer data (Step S116; NO), the CPU 11 determines whether or not a predetermined period has elapsed since the end of the positioning operation (Step S117). This predetermined period is equal to the total period of "the longest determination period that the electronic timepiece 40 can take to make a determination about success/failure of the connection in Step S482 in the data transfer process of the electronic timepiece 40 (i.e. a period to time the connection attempt out)×2 (the maximum number of attempts)+the predetermined stand-by period in Step S497". If the CPU 11 determines that the predetermined period has not elapsed yet (Step S117; NO), the CPU 11 returns to Step S116 and attempts to receive transfer data again. If the CPU 11 determines that the predetermined period has elapsed (Step S117; YES), the CPU 11 ends the positioning result obtainment process.

In Step S116, if the CPU 11 determines that it has received transfer data (Step S116; YES), the CPU 11 obtains altitude data in the transfer data received from the electronic timepiece 40 (Step S118). The CPU 11 calculates the obtainment (measurement) timing(s) of the obtained altitude data, and, with respect to (each) altitude data, correlates the altitude data with its corresponding positioning result (Step S119). The CPU 11 then ends the positioning result obtainment process.

Figure 10A:
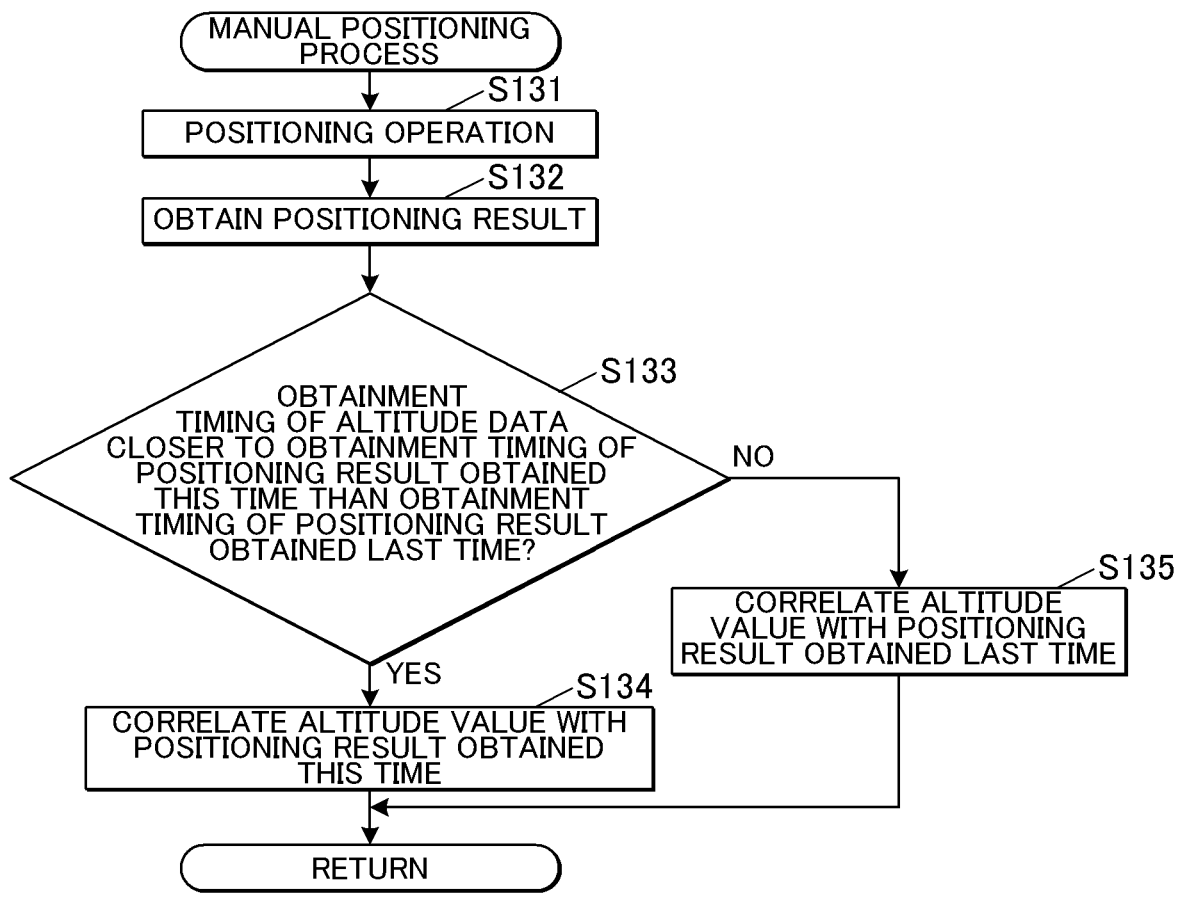
FIG. 10A is a flowchart showing a control procedure of a manual positioning process.
Figure 10B:
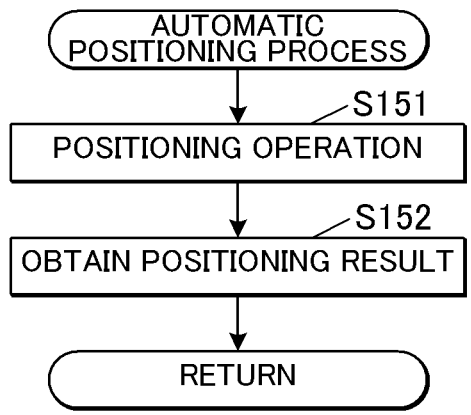
FIG. 10B is a flowchart showing a control procedure of an automatic positioning process.

FIG. 10A is a flowchart showing a control procedure in the manual positioning process called in the positioning result obtainment process. FIG. 10B is a flowchart showing a control procedure in the automatic positioning process called in the positioning result obtainment process.

As shown in FIG. 10A, when the manual positioning process is called, the CPU 11 causes the satellite radio wave receiver/processor 26 to perform positioning operation (Step S131). The CPU 11 obtains one positioning result from the satellite radio wave receiver/processor 26 (Step S132). The CPU 11 determines whether the obtainment timing of the altitude data which has triggered the manual positioning process is closer to the obtainment timing of the positioning result obtained this time (by this manual positioning process) or the obtainment timing of the positioning result obtained last time (by the automatic positioning process) (Step S133).

If the CPU 11 determines that the obtainment timing of the altitude data is closer to the obtainment timing of the positioning result obtained this time (Step S133; YES), the CPU 11 correlates and stores the altitude data (altitude value) with the positioning result obtained this time (Step S134). The CPU 11 then ends the manual positioning process and returns to the positioning result obtainment process.

If the CPU 11 determines that the obtainment timing of the altitude data is not closer to the obtainment timing of the positioning result obtained this time (i.e. is closer to the obtainment timing of the positioning result obtained last time) (Step S133; NO), the CPU 11 correlates and stores the altitude data (altitude value) with the positioning result obtained last time (Step S135). More specifically, the CPU 11 correlates and stores the altitude value and its measurement (obtainment) time with the horizontal position (latitude and longitude) in the positioning result obtained last time. That is, the horizontal position in the last (most recent) positioning result automatically obtained at predetermined intervals is used as data at the automatic obtainment timing of the positioning result itself and as data at the manual obtainment timing of the altitude value. The CPU 11 then ends the manual positioning process and returns to the positioning result obtainment process.

When the automatic positioning process is called, as shown in FIG. 10B, the CPU 11 causes the satellite radio wave receiver/processor 26 to perform positioning operation (Step S151). The CPU 11 obtains one positioning result from the satellite radio wave receiver/processor 26 (Step S152). The CPU 11 then ends the automatic positioning process and returns to the positioning result obtainment process.

As described above, the smartphone 10 of this embodiment includes: the receiver 261 that receives radio waves from positioning satellites; the CPU 11 that performs positioning at intervals of a first period (two-minute intervals in this embodiment) based on the radio waves from the positioning satellites received by the receiver 261; and the communication unit 23 that receives, from the electronic timepiece 40 as an external device, altitude information on each altitude obtained by the electronic timepiece 40. The CPU 11, (a) from the electronic timepiece 40, receives the altitude information on altitudes obtained at intervals of the first period, at intervals of a second period (30-minute intervals in this embodiment) that is longer than the first period, and individually receives the altitude information on an altitude obtained not at intervals of the first period, in approximately real time; (b) in response to receiving the altitude information on the altitude obtained not at intervals of the first period, causes the satellite radio wave receiver/processor 26 to perform the positioning at a timing of receiving the altitude information on the altitude; and (c) based on (i) obtainment timings of the altitudes in the electronic timepiece 40 received at intervals of the second period and (ii) an obtainment timing of the altitude in the electronic timepiece 40 received individually, correlates the altitudes of the altitude information received at intervals of the second period and the altitude of the altitude information received individually with positioning results of the positioning such that the obtainment timings correspond to positioning timings of the positioning results.

That is, the smartphone 10 combines horizontal positions obtained by the smartphone 10 itself with altitude values obtained by another device. This can create a highly accurate history (record) of positions. In the automatic mode, for which intervals for positioning and altitude obtainment are predetermined, the smartphone 10 does not receive altitude data from another device (electronic timepiece 40) at each positioning timing, i.e. does not receive altitude data in approximately real time. This can reduce power consumption required for communication. Meanwhile, in the manual mode, which is activated irregularly, the smartphone 10 receives altitude data from the electronic timepiece 40 in approximately real time, and performs positioning by being triggered thereby. This can suppress deviation between altitude obtainment timings and horizontal-position obtainment timings (positioning timings), and consequently makes it possible to appropriately obtain highly accurate three-dimensional positions stably for a long period.

Furthermore, the altitude information received at intervals of the second period does not include information on obtainment times of the altitudes in the electronic timepiece 40, and the altitude information received individually includes information on an obtainment time of the altitude in the electronic timepiece 40. That is, because obtainment times of altitudes in the electronic timepieces 40 in the automatic mode, which is activated regularly, can be calculated later (i.e. by the smartphone 10), it is unnecessary for the electronic timepiece 40 to include the obtainment times in the altitude information to store the obtainment times therein or send data thereof to the smartphone 10. This can suppress the memory capacity of the electronic timepiece 40 and reduce a data transfer period, and consequently can reduce costs and time/effort.

Furthermore, the CPU 11 receives, from the electronic timepiece 40, information on an altitude obtainment start timing of the electronic timepiece 40 obtaining the altitudes at intervals of the first period, and in accordance with the altitude obtainment start timing, determines the positioning timings of the CPU 11 (satellite radio wave receiver/processor 26) performing the positioning at intervals of the first period. That is, because the measurement (altitude obtainment and positioning) start timing is arbitrary determined in accordance with, for example, a timing at which the operation receiver 51 receives an input operation, the smartphone 10 receives this information only, and calculates timings on the basis of, for example, the first period, and consequently can identify all the altitude obtainment timings. This makes it unnecessary for the electronic timepiece 40 to store all the altitude obtainment timings or times, and consequently can suppress the memory capacity of the electronic timepiece 40, and reduce the data transfer period.

Furthermore, the first period is changeable, and the CPU 11 receives information on the first period from the electronic timepiece 40 via the communication unit 23. That is, the first period can be changed according to the reason to obtain a movement history, the situation, or the like. This makes it possible to obtain a proper movement interval and change in a moving direction. By obtaining the information on the first period together with the first altitude information (altitude), the smartphone 10 can easily identify the following altitude (altitude information) obtainment timings or times, and also can determine positioning timings or times.

Furthermore, the CPU 11 correlates the altitude of the altitude information obtained not at intervals of the first period with, among the positioning results, either (i) a positioning result obtained in response to receiving the altitude of the altitude information or (ii) a positioning result obtained at intervals of the first period, whichever positioning timing the obtainment timing of the altitude of the altitude information is closer to.

That is, in the case of the manual mode, there may be a case where communication connection between the smartphone 10 and the electronic timepiece 40 does not succeed in approximately real time, and in the end, the positioning timing of positioning performed for the altitude manually obtained deviates from the obtainment timing of the altitude, and the most recent positioning timing in the automatic mode is closer to the obtainment timing of the altitude. In this case, the altitude manually obtained is correlated with, between the two, a positioning result the positioning timing of which is closer to the obtainment timing of the altitude. This can further increase three-dimensional-position accuracy.

Furthermore, in response to obtaining a positioning ending command, the CPU 11, via the communication unit 23, receives the remaining altitude information not yet received from the electronic timepiece 40, and in response to failing to receive the remaining altitude information, attempts to receive the remaining altitude information again until a predetermined period elapses. That is, if there is unsent (not-yet-transferred) altitude information in the electronic timepiece 40 at the timing to end the position measurement, the altitude information may be sent immediately. Even if the immediate transfer (sending) fails, retransfer (resending) after a predetermined period is available. This can reduce possibility of errors in obtaining altitude values that is performed by the smartphone 10.

Furthermore, as described above, the electronic timepiece 40 of this embodiment includes: the measurer 54 including the air pressure sensor that measures air pressure; the CPU 41 that obtains altitudes at intervals of a first period based on the measured air pressure; the memory 42 that stores altitude information on each of the obtained altitudes as the measured altitude data 422; the communication unit 53 that sends the stored altitude information to the smartphone 10 as an external device that performs positioning; and the operation receiver 51 that receives an input operation from outside.

The CPU 41 sends the altitude information on the altitudes obtained at intervals of the first period, at intervals of a second period that is longer than the first period; and obtains an altitude at a timing at which the operation receiver 51 receives a predetermined command, and sends the altitude information on the altitude not at intervals of the second period.

Thus, the electronic timepiece 40 obtains altitudes with an air pressure sensor, and sends information on the obtained altitudes at proper timings and proper intervals to the smartphone 10 that performs positioning. Such simple measurement and processing can suppress increase in power consumption, and allows the smartphone 10 to keep more proper three-dimensional positions. Furthermore, the electronic timepiece 40 itself little performs processes for creating three-dimensional positions, and consequently can save much effort and time.

Furthermore, the memory 42 stores the altitude information that includes the altitudes obtained at intervals of the first period but does not include information on obtainment times of the altitudes, until the altitude information is sent to the smartphone 10; and stores the altitude information that includes the altitude obtained not at intervals of the first period and information on an obtainment time of the altitude, until the altitude information is sent to the smartphone 10. That is, altitude information automatically obtained and altitude information manually obtained are stored in different formats, and only temporarily stored until transferred. This enables efficient use of the limited capacity of the memory 42.

Furthermore, the memory 42 stores information on the first period being correlated with the altitude information that does not include the information on the obtainment times, and the CPU 41 sends the information on the first period to the smartphone 10 when sending the altitude information that is first altitude information.

That is, if, in particular, the first period is changed irregularly, information on the first period is stored in the memory 42 and once sent to the smartphone 10. This allows the smartphone 10 to easily identify all the obtainment timings or times of the altitudes.

Furthermore, the memory 42 can store the altitude information on a greater number of altitudes than the number of the altitudes obtained at intervals of the first period in the second period, and in response to failing to send the altitude information that includes the altitudes obtained at intervals of the first period to the smartphone 10, the CPU 41 sends the altitude information failed to be sent when communicating with the smartphone 10 next time.

In the case of measurement during movement, although the electronic timepiece 40 can keep connecting and communicating with the smartphone 10 in accordance with near-field communication, the electronic timepiece 40 may have temporary difficulty in communicating with the smartphone 10. However, as described above, the altitude information in the electronic timepiece 40 is not immediately deleted. This can reduce possibility of loss of altitude values that should be integrated into positioning results.

Furthermore, the memory 42 can store the altitude information on the number of altitudes that is twice or more than the number of the altitudes obtained at intervals of the first period in the second period. That is, even if communication at second-period intervals fails once, the altitude information is not lost until the next connection timing. This enables proper transfer of the altitude information to the smartphone 10 without increasing the reception frequency of the smartphone 10, and consequently can suppress increase in power consumption of the electronic timepiece 40. Furthermore, some increase in the reception frequency of the smartphone 10 can reduce the possibility of loss of altitude data to a sufficient level.

Furthermore, while not succeeding in the sending, the CPU 41 deletes, in accordance with a predetermined condition, the altitude information obtained previously and stored in the memory 42 in response to the number of the obtained altitudes of the altitude information exceeding the maximum number of altitudes of the altitude information storable in the memory 42. That is, not keeping un-transferred altitude information for a long period can suppress costs and power consumption without increase in the size of the memory 42. Furthermore, even if the altitude information obtained by the electronic timepiece 40 is lost, the three-dimensional positioning results obtained by the smartphone 10 are present. Hence, it does not happen that three-dimensional positioning results, i.e. three-dimensional positions, cannot be obtained. That is, although the accuracy may be lower a little, a history of change in the current position can be obtained in the smartphone 10.

Furthermore, as described above, the positional information obtaining method of this embodiment is the positional information obtaining method for the smartphone 10 that includes: the receiver 261 that receives radio waves from positioning satellites; and the communication unit 23 that receives, from the electronic timepiece 40 as an external device, altitude information on each altitude obtained by the electronic timepiece 40. The positional information obtaining method includes: (a) performing positioning at intervals of a first period based on the radio waves from the positioning satellites received by the receiver 261; (b) from the electronic timepiece 40, receiving the altitude information on altitudes obtained at intervals of the first period, at intervals of a second period that is longer than the first period, and individually receiving the altitude information on an altitude obtained not at intervals of the first period; (c) in response to receiving the altitude information on the altitude obtained not at intervals of the first period, performing the positioning at a timing of receiving the altitude information on the altitude; and (d) based on (i) obtainment timings of the altitudes in the electronic timepiece 40 received at intervals of the second period and (ii) an obtainment timing of the altitude in the electronic timepiece 40 received individually, correlating the altitudes of the altitude information received at intervals of the second period and the altitude of the altitude information received individually with positioning results of the positioning such that the obtainment timings correspond to positioning timings of the positioning results.

Thus, efficiently and properly correlating and combining altitude values obtained by the electronic timepiece 40, which can obtain accurate altitude information, with horizontal positions obtained by the smartphone 10, which can obtain accurate horizontal positions, enables, in the end, obtainment of a proper history of change of three-dimensional positions while suppressing increase in size of, weight of, costs for, and effort/time for each electronic device (smartphone 10 and electronic timepiece 40). Furthermore, when altitude information is needed, such as during mountain climbing or hill climbing, a user can make use of, in real time, the electronic timepiece 40 that is wearable (e.g. watch) and can easily obtain altitude information, and later can see a more highly accurate history of three-dimensional positions. Thus, user-friendliness is enhanced.

The present invention is not limited to the above embodiment, and can be variously modified.

For example, although in the above embodiment, time information is included in altitude information when an altitude is obtained manually, this time information may not be included in the first contents to be sent. In this case, a timing at which communication connection with the smartphone 10 is established or a time determined by this timing with a predetermined offset period may be treated as the obtainment timing or time of the altitude. If retransfer is performed after the commutation connection fails, the aforementioned time information may be included in the contents to be sent.

Furthermore, although in the above embodiment, automatically obtained data and manually obtained data are stored separately in the electronic timepiece 40, they may be stored in the same time series. In this case, the maximum number of data to be stored are shared by the automatically obtained data and the manually obtained data, and as one of them increases in number, the other thereof decreases in number. Manually obtained data has time information at the head to be distinguished from automatically obtained data.

Furthermore, although in the above embodiment, transfer-done data are deleted, and if data transfer fails, the unsent data are shifted to log data, the transfer-done data may not be deleted. For example, the electronic timepiece 40 may store data in array locations (storage regions) of the measured altitude data 422 in order in a loop manner, and store the array locations of the oldest data and the newest transfer-done data among the data stored at present to determine data that need to be transferred and to determine the transfer order.

Furthermore, although in the above embodiment, if a positioning result is obtained at a timing deviating from the obtainment timing of an altitude due to poor communication connection or positioning failure, the altitude is integrated into a positioning result, to be specific, combined with a horizontal position therein, of positioning performed last time, the current horizontal position may be determined, for example, by linear interpolation using the horizontal position obtained by the last positioning and a horizontal position obtained by positioning the positioning timing of which is second closest to the obtainment timing of the altitude.

Furthermore, although in the above embodiment, the fully automatic positioning and the one-off manual positioning in response to a user input operation are cited, if positioning (and altitude obtainment in the electronic timepiece 40) is performed multiple times at predetermined intervals on the basis of a user input operation(s), the smartphone 10 may perform the above-described correlation by regarding this positioning performed multiple times as a kind of automatic positioning in which positioning is performed a predetermined number of times at predetermined intervals, or performed at predetermined intervals in a predetermined period.

Furthermore, although in the above embodiment, the electronic timepiece 40 first starts obtaining altitudes, and then connects with the smartphone 10 to cause the smartphone 10 to start positioning, the electronic timepiece 40 may first cause the smartphone 10 to perform positioning, and then start obtaining altitudes because the first positioning could take much time.

Furthermore, the near-field communication is not limited to Bluetooth® communication, and hence may be infrared communication or another communication protocol.

Furthermore, although in the above embodiment, the electronic timepiece 40 and the smartphone 10 are cited as a combination of electronic devices, the combination is not limited thereto. The combination can be any as far as an electronic device has an air pressure sensor and can convert measured values of air pressure into altitude values, and another electronic device can perform positioning.

Furthermore, although in the above embodiment, as computer-readable media storing the programs 121 for control to obtain positional information and storing the programs 421 for control to obtain altitude information, the memories 12 and 42 each constituted of a nonvolatile memory, such as an HDD, an SSD or a flash memory, and/or the like are cited, the computer-readable media are not limited thereto. The computer readable mediums may each be another type of nonvolatile memory, such as an MRAM, or a portable recording medium, such as a CD-ROM or a DVD. Furthermore, as media to provide, via a communication line, data of the programs disclosed herein, carrier waves may be used.

Besides, the specific details of the configurations/components, control procedures, display examples, and so forth described in the above embodiment can be appropriately modified without departing from the scope of the present invention.

In the above, although one or more embodiments have been described, the scope of the present invention is not limited to the embodiments, and includes the scope of claims below and the scope of their equivalents.

What is claimed is:

1. An electronic device comprising:
   a receiver that receives radio waves from positioning satellites;
   a processor that performs positioning at intervals of a first period based on the radio waves from the positioning satellites received by the receiver; and
   a communication unit that receives, from an external device, altitude information obtained by the external device converting an air pressure value measured thereby into an altitude value, wherein
   the processor:
      from the external device, receives the altitude information obtained at intervals of the first period, at intervals of a second period that is longer than the first period, and individually receives the altitude information obtained not at intervals of the first period;
      in response to receiving the altitude information obtained not at intervals of the first period, performs the positioning at a timing of receiving the altitude information;
      in response to receiving, from the external device, information on an altitude obtainment start timing of altitude obtainment in the external device, determines a positioning timing based on the altitude obtainment start timing and performs the positioning; and
      based on (i) obtainment timings of altitudes in the external device received at intervals of the second period and (ii) an obtainment timing of an altitude in the external device received individually, correlates the altitudes of the altitude information received at intervals of the second period and the altitude of the altitude information received individually with positioning results of the positioning such that the obtainment timings correspond to positioning timings of the positioning results.

2. The electronic device according to claim 1, wherein the altitude information received at intervals of the second period does not include information on obtainment times of the altitudes in the external device, and the altitude information received individually includes information on an obtainment time of the altitude in the external device.

3. The electronic device according to claim 1, wherein the processor receives, from the external device, information on an altitude obtainment start timing of the external device obtaining the altitudes at intervals of the first period, and in accordance with the altitude obtainment start timing, determines the positioning timings of the processor performing the positioning at intervals of the first period.

4. The electronic device according to claim 2, wherein the processor receives, from the external device, information on an altitude obtainment start timing of the external device obtaining the altitudes at intervals of the first period, and in accordance with the altitude obtainment start timing, determines the positioning timings of the processor performing the positioning at intervals of the first period.

5. The electronic device according to claim 1, wherein the first period is changeable, and the processor receives information on the first period from the external device via the communication unit.

6. The electronic device according to claim 1, wherein the processor correlates the altitude information obtained not at intervals of the first period with, among the positioning results, either (i) a positioning result obtained in response to receiving the altitude information or (ii) a positioning result obtained at intervals of the first period, whichever positioning timing the obtainment timing of the altitude of the altitude information is closer to.

7. The electronic device according to claim 1, wherein in response to obtaining a positioning ending command, the processor, via the communication unit, receives remaining altitude information not yet received from the external device, and in response to failing to receive the remaining altitude information, attempts to receive the remaining altitude information again until a predetermined period elapses.

8. A positional information obtaining method for an electronic device including: a receiver that receives radio waves from positioning satellites; and a communication unit that receives, from an external device, altitude information obtained by the external device converting an air pressure value measured thereby into an altitude value, the positional information obtaining method comprising:
   performing positioning at intervals of a first period based on the radio waves from the positioning satellites received by the receiver;
   from the external device, receiving the altitude information obtained at intervals of the first period, at intervals of a second period that is longer than the first period, and individually receiving the altitude information obtained not at intervals of the first period;

in response to receiving the altitude information obtained not at intervals of the first period, performing the positioning at a timing of receiving the altitude information;

in response to receiving, from the external device, information on an altitude obtainment start timing of altitude obtainment in the external device, determining a positioning timing based on the altitude obtainment start timing and performs the positioning; and based on (i) obtainment timings of the altitudes in external device received at intervals of the second period and (ii) an obtainment timing of an altitude in the external device received individually, correlating the altitudes of the altitude information received at intervals of the second period and the altitude of the altitude information received individually with positioning results of the positioning such that the obtainment timings correspond to positioning timings of the positioning results.

9. The positional information obtaining method according to claim 8, wherein the altitude information received at intervals of the second period does not include information on obtainment times of the altitudes in the external device, and the altitude information received individually includes information on an obtainment time of the altitude in the external device.

* * * * *